United States Patent [19]
Adachi

[11] Patent Number: 5,619,167
[45] Date of Patent: Apr. 8, 1997

[54] MAXIMUM LIKELIHOOD DECODING COHERENT DETECTION METHOD

[75] Inventor: Fumiyuki Adachi, Yokohama, Japan

[73] Assignee: NTT Mobile Communications Network, Inc., Tokyo, Japan

[21] Appl. No.: 569,261

[22] PCT Filed: Jun. 23, 1995

[86] PCT No.: PCT/JP95/01262

§ 371 Date: Dec. 22, 1995

§ 102(e) Date: Dec. 22, 1995

[87] PCT Pub. No.: WO96/00475

PCT Pub. Date: Jan. 4, 1996

[30] Foreign Application Priority Data

Jun. 23, 1994 [JP] Japan ................................. 6-141834

[51] Int. Cl.[6] ................................................. H04L 27/227
[52] U.S. Cl. ........................ 329/304; 329/306; 375/325; 375/328; 375/329; 375/332; 375/341
[58] Field of Search ................................. 329/304, 306, 329/310; 375/324, 325, 328, 329, 332, 341

[56] References Cited

U.S. PATENT DOCUMENTS 5,291,523  3/1994  Bergmans et al. ................. 375/232
5,450,445  9/1995  Ushirokawa ........................ 375/324

FOREIGN PATENT DOCUMENTS 5-316155  11/1993  Japan.
6-152670   5/1994  Japan.

OTHER PUBLICATIONS

Kam, "Maximum-Likelihood Digital Data Sequence Estimation Over the Gaussian Channel with Unknown Carrier Phase", IEEE Transactions on Communications, vol. COM-35, No. 7, pp. 764–767.

Divsalar, et al, "Multiple-Symbol Differential Detection of MPSK", IEEE Transactions on Communications, vol. 38, No. 3, pp. 300–308.

*Primary Examiner*—Siegfried H. Grimm
*Attorney, Agent, or Firm*—Pollock, Vande Sande & Priddy

[57] ABSTRACT

A received signal sample sequence is inversely modulated by a symbol sequence forming the trellis state at the immediately preceding time, by which a reference signal is generated. This reference signal and the inner product of the received signal sample at the current time and a candidate symbol phase are used as a branch metric to make a sequence estimation by the Viterbi algorithm.

11 Claims, 10 Drawing Sheets

KNOWN SYMBOL SEQUENCE (Q SYMBOLS)

MAXIMUM LIKELIHOOD DECODING COHERENT DETECTION METHOD

TECHNICAL FIELD

The present invention relates to a maximum likelihood coherent detection method which makes the maximum likelihood estimation of a reference signal for coherent detection and the maximum likelihood sequence estimation of a transmitted symbol sequence at the same time through the use of a plurality of received signal samples obtained by sampling a received phase-modulated digital signal with the symbol period.

PRIOR ART

Coherent detection and differential detection are widely used for the demodulation of phase-modulated signals. The coherent detection provides an excellent error rate performance as compared with the differential detection. To perform the coherent detection, it is necessary that the phase of the received carrier be known. To this end, the receiving side regenerates the carrier by some means, uses it as a reference signal to coherently detect the modulated phase of the received signal and decides the transmitted data. As a method of extracting an M-phase PSK reference signal, there is known a multiplying method according to which the received signal is M multiplied to remove therefrom the modulated phase, the multiplied signal is used to effect phase control of a voltage-controlled oscillator (VCO) to generate a signal of a frequency M times higher than the carrier frequency and the frequency of the signal is divided by M to regenerate the carrier. Another known method is, for example, an inverse modulation method according to which a detected data is used to inversely modulate the received signal to remove therefrom the modulated phase and then the carrier is similarly regenerated using the VCO. However, these methods are disadvantageous in that no fast carrier regeneration is possible because the carrier extracting and regenerating steps form a closed loop using the VCO.

Since the regenerated carrier has a phase uncertainty of $2\pi/M$ rad., a konwn signal sequence (several symbols, for instance) is transmitted periodically and used to avoid the uncertainty of the phase. This coherent detection is called absolute coherent detection in the sense of detecting the absolute phase. On the other hand, it is possible to exclude the influence of the phase uncertainty by differential encoding at the sending side and differential decoding at the receiving side, but the error rate in this instance would be about twice that of the absolute coherent detection scheme. Moreover, the bit error rate performance of the absolute coherent detection is superior to that of the differential detection. In the case of four-phase PSK, the difference between the differential detection and the absolute coherent detection in the ratio $E_b/N_o$ of the received energy per bit necessary for securing a 0.1% bit error rate to the noise power density is as large as 2.5 dB or so.

Incidentally, there has been proposed a coherent detection scheme which does not involve the carrier regeneration of the above-mentioned methods (Literature 1: D. Divsalar and M. K. Simon, "Multiple-symbol differential detection of MPSK," IEEE Trans. Commum., vol. 38, pp. 300–308, March 1990 and Literature 2: P. Y. Kam, "Maximum-likelihood digital data sequence estimation over the Gaussian channel with unknown carrier phase," IEEE Trans. Commun., vol. COM-35, pp. 764–767, July 1987). The methods proposed in Literature 1 and 2 make the maximum likelihood phase sequence estimation of transmitted symbols through the use of received signal samples produced by sampling the received signal with the symbol period. A metric is calculated for each sequence composed of N symbols using N received signal samples and the sequence of the maximum metric is outputted. Hence, the carrier phase need not be regenerated. To obtain bit error rate performance close to that of ideal coherent detection, it is necessary to increase the number N of symbols for sequence estimation. Since the number of metric calculations for maximum estimation becomes $M^N$, however, the amount of calculation increases exponentially as the number M of modulated phases and the number N of transmitted symbols increase.

An object of the present invention is to provide an approximate maximum likelihood decoding coherent detection method which makes a sequential transmitted symbol sequence estimation through the use of the Viterbi algorithm but permits reduction of the amount of processing required.

DISCLOSURE OF THE INVENTION

In a first aspect, the present invention is directed to a maximum likelihood decoding coherent detection method for an M-phase modulation (MPSK) with known pilot symbols inserted therein periodically, the method comprising the steps of:

(a) sampling a received signal at a time n with a transmitted symbol period T to obtain a received signal sample $z_n$;

(b) storing, in a metric memory at each point in time, $M^Q$ states each represented by a combination of Q successive modulated phases $\{\phi_{n-q}; q=1, 2, \ldots, Q-1, Q\}$ and paths each indicating the state at the immediately previous time from which a path most likely to reach one of the $M^Q$ states originates, and storing a path metric indicating the likelihood of each sequence that reaches one of the states in a metric memory;

(c) inversely modulating a received signal sample $z_{n-q}$ by $\phi_{n-q}$ and calculating the real value of the inner product of a value $z_n \exp(-j\phi_n)$ at $q=0$ and a summation $\Sigma z_{n-q} \exp(-j\phi_{n-q})$ from $q=1$ to $Q$, the real value being defined as a branch metric $\lambda(S_{n-1} \to S_n)$ indicating the likelihood of the transition from a state $S_{n-1}=\{\phi_{n-q}; q=1, 2, \ldots, Q-1, Q\}$ at time $n-1$ to a state $S_n=\{\phi_{n-q}; q=0, 1, 2, \ldots, Q-1\}$;

(d) adding the branch metric to a path metric $\Lambda(S_{n-1})$ in the state $S_{n-1}$ at time $n-1$ to calculate a path metric $\Lambda(S_n|S_{n-1})$ of a candidate sequence which passes through the state $S_{n-1}$;

(e) repeating the calculations of steps (c) and (d) for all states $S_{n-1}$ of paths at time $n-1$ which enter the state $S_n$, comparing the thus obtained path metrics in terms of magnitude, and selecting the state $S_{n-1}'$ of the maximum path metric;

(f) storing the state $S_{n-1}'$ in the path memory as the state of path at time $t_{n-1}$ which is most likely to reach the state $S_n$ at time n, and storing its path metric $\Lambda(S_n|S_{n-1}')$ in the metric memory as the path metric $\Lambda(S_n)$ in the state $S_n$ at time n;

(g) repeating the above calculations of steps (c)–(f) for all of the $M^Q$ states at time n;

(h) comparing the path metrics in the $M^Q$ states in terms of magnitude to obtain a state $S_n'$ of the maximum value at the time of outputting a decoded symbol; and (i) tracing the path memory back for a fixed number D of points in time from the state $S_n'$, and outputting, as the phase of decoded symbol, the phase $\phi_{n-D}$ which constitutes the state $S_{n-D}$ reached.

In a second aspect, the present invention is directed to a maximum likelihood decoding coherent detection method which performs maximum likelihood decoding through the use of a path memory for storing the phase state at the immediately previous point in time from which each path originates which is most likely to reach one of M states indicating the modulated phase at each point in time, and a metric memory for storing, for each state, a path metric indicating the likelihood of a sequence that reaches the state, the method comprising the steps of:

(a) sampling a received signal with a transmitted symbol period to obtain a received signal sample $z_n$ at time n;

(b) at the time of selecting a path most likely to reach a state $S_n$ at time n from M phase states $S_{n-1}$ at time (n−1), tracing the path memory back from one of the M states at time n−1 to obtain a most likely sequence $\{\phi_{n-1}, \phi_{n-q|n-1}; q=2, 3, \ldots, Q-1, Q\}$ which ends with the state $S_{n-1}$, and calculating a reference signal $\eta_n$ using the sequence by $$\eta_n = z_{n-1}\exp(-j\phi_{n-1}) + \sum_{q=2}^{Q} z_{n-q}\exp(-j\bar{\phi}_{n-q|n-1});$$

(c) inversely modulating a received signal sample $z_n$ by $\phi_n$ and calculating the real value of the inner product of the reference signal $\eta_n$ and the value $z_n\exp{-j\phi_n}$ as a branch metric $\lambda(S_{n-1} \rightarrow Sn)$ indicating the likelihood of transition from the state $S_{n-1}$ at time n−1 to the state $S_n$ at time n;

(d) adding the branch metric $\lambda(S_{n-1} \rightarrow S_n)$ to a path metric $\Lambda(S_{n-1})$ in the state $S_{n-1}$ at time n−1 to obtain a path metric $\Lambda(S_n|S_{n-1})$ of a candidate sequence which passes through the state $S_{n-1}$;

(e) repeating the calculations of steps (b), (c) and (d) for all of the M states $S_{n-1}$ to obtain path metrics for M candidate sequences and comparing them in terms of magnitude to obtain a state $S_{n-1}'$ of the maximum value;

(f) storing the state $S_{n-1}'$ of the maximum value in the path memory as the state at time n−1 which is most likely to reach the state $S_n$ at time n, and storing its path metric $\Lambda(S_n|S_{n-1}')$ in the metric memory as the path metric $\Lambda(S_n)$ in the state $S_n$ at time n;

(g) repeating the above calculations of steps (b)–(f) for all the M states to obtain M path metrics, and comparing them in terms of magnitude to obtain a state $S_n'$ of the maximum value; and (h) tracing the path memory back for a fixed number D of points in time from the state $S_n'$, and outputting, as a decoded symbol phase $\bar{\phi}_{n-D}$, the phase $\phi_{n-D}$ which constitutes the state $S_{n-D}$ reached.

In a third aspect, the present invention is directed to a maximum likelihood decoding coherent detection method which performs maximum likelihood decoding through the use of a path memory for storing the phase state at the immediately previous point in time from which each path originates which is most likely to reach one of M states indicating the modulated phase at each point in time, and a metric memory for storing, for each state, a path metric indicating the likelihood of a sequence that reaches the state, the method comprising the steps of:

(a) sampling a received signal with a transmitted symbol period to obtain a received signal sample $z_n$ at time n;

(b) calculating a reference signal $\eta_n$ by the following equation using a prediction coefficient $\alpha$ as a real number, $$\eta_n = (1+\alpha)z_{n-1}\exp(-j\phi_{n-1}) - \alpha z_{n-2}\exp(-j\phi_{n-2})$$

so as to calculate $M^2$ states $S_n$ at time n each represented by a combination of two successive phases $(\phi_n, \phi_{n-1})$ and branch metrics each indicating the state $S_{n-1}$ at the immediately previous time n from which a path most likely to reach one of the $M^2$ states originates;

(c) calculating a square error between a signal phase rotated $\phi_n$ from the reference signal $\eta_n$ and the received signal sample $Z_n$ as a branch metric $\lambda(S_{n-1} \rightarrow S_n)$ indicating the likelihood of transition from the state $S_{n-1}$ to $S_n$;

(d) adding the branch metric $\lambda(S_{n-1} \rightarrow S_n)$ to the path metric $H(S_{n-1})$ in the state $S_{n-1}$ at time n−1 to obtain the metric $H(S_{n-1})$ of a candidate sequence which passes through the state $S_{n-1}$;

(e) repeating the above calculations of steps (b)–(d) for all of the $M^2$ states $S_{n-1}$, comparing the resulting path metrics in terms of magnitude to obtain a state $S_{n-1}'$ of the minimum value, storing it in a path memory as the state through which a survival path reaches the state $S_n$ at time n, and storing its path metric $H(S_n|S_{n-1}')$ in a path metric memory as the path metric $H(S_n)$ in the state $S_n$; and (f) repeating the above operations of steps (b)–(e) for all of the $M^2$ states to obtain path metrics, comparing them in terms of magnitude to obtain a state $S_n'$ of the minimum value, tracing the path memory back for a fixed number D of points in time from the state $S_n'$, and outputting, as a decoded symbol phase $\bar{\phi}_{n-D}$, the phase $\phi_{n-D}$ which constitutes the state $S_{n-D}$ reached.

According to a fourth aspect of the present invention, in the third aspect, the state $S_n$ at time n is represented by only one phase $\phi_n$, and the reference signal calculating step is a step of calculating the reference signal $\eta_n$ by the following equation using the phase $\phi_{n-2|n-1}$ at time n−2 on a survival path which ends with one of the states $S_{n-1}$:

$$\eta_n = (1+\alpha)z_{n-1}\exp(-j\phi_{n-1}) - \alpha z_{n-2}\exp(-j\bar{\phi}_{n-1|n-1}).$$

As described above for the first aspect of the present invention, the coherent detection method of the present invention has, for the M-phase modulation, $M^Q$ phase difference states at each point in time which can be represented by combinations of Q successive modulated phases $\{\phi_{n-q}; q=0, 1, 2, \ldots, Q-1\}$, and selects a most likely path at each point in time. One of M paths extending to each state from states at the immediately previous time is selected. Accordingly, the number of metric calculations per symbol is $M^Q \times M = M^{Q+1}$ and hence $NM^{Q+1}$ per N-symbol data. The record aspect of the present invention reduces the number of metric calculations to $M^2$ irrespective of Q. The same error rate as that obtainable with the methods of Literature 1 and 2 can be achieved with the value Q far smaller than the number N of data symbols. Thus, the present invention has an advantage that the number of metric calculations can be significantly reduced as compared with those by the methods of Literature 1 and 2.

BEST MODE FOR CARRYING OUT THE INVENTION

First Embodiment

A first embodiment of the present invention will be described first using mathemacical expressions.

Now, consider the maximum likelihood estimation of an N-symbol phase sequence $\phi_n$ (n=0, 1, 2, ..., N-1) being transmitted. An M-phase PSK signal received at time $(n-1)T \leq t \leq nT$ can be expressed by $$z(t) = (2E_s/T)^{1/2} exp\{j(\phi_n+\theta)\} + w(t) \quad (1)$$

where $\phi_n = \{2m\pi/M; m=0, 1, \ldots, M-1\}$ is the modulated phase, $E_s$ the energy per symbol, T one symbol length, $\theta$ the phase difference between the received signal carrier and a receiver local oscillation signal, and w(t) receiver noise. The signal z(t) is filtered and then sampled at discrete points in time n=0, 1, 2, ... for each symbol period T. Let the thus obtained sample sequence be represented by $\{z_n; n=0, 1, 2, \ldots, N-1\}$. In Literature 1 and 2 it is described that it is the maximum likelihood sequence that maximizes the metric given by the following equation:

$$\Lambda = \left| \sum_{n=0}^{N-1} z_n exp(-j\phi_n) \right|^2 \quad (2)$$

If the maximum sequence likelihood estimation is made faithfully to Literature 1 and 2, the metric calculation has to be done $M^N$ times as referred to previously.

In accordance with the present invention, Eq. (2) is modified first as follows:

$$\Lambda = \sum_{n=0}^{N-1} |z_n|^2 + \quad (3)$$

$$2 \sum_{n=0}^{N-1} Re \left\{ z_n \left[ \sum_{q=1}^{n} z_{n-q} exp(-j\phi_{n-q}) \right] * exp(-j\phi_n) \right\}$$

where * indicates a complex conjugate and Re[x] the real part of any complex number x.

On the right side of Eq. (3) the first term is unrelated to the sequence, and hence can be omitted. In Eq. (3) the upper limit of the summation concerning q is n and its maximum value is N-1. On this account, the amount of processing required increases exponentially as the sequence grows longer. To avoid this, the upper limit of the summation concerning q is set to Q(<<N) and the path metric is defined by the following equation:

$$\Lambda = \sum_{n=0}^{N-1} Re \left\{ z_n \left[ \sum_{q=1}^{Q} z_{n-q} exp(-j\phi_{n-q}) \right] * exp(-j\phi_n) \right\} \quad (4)$$

By the definition like this, sequences of the maximum path metric $\Lambda$ can be sequentially estimated for each of the $M^Q$-states by the Viterbi algorithm with the branch metric set as follows:

$$\lambda(\phi_{n-1}{\to}\phi_n) = Re\{z_n\eta_n{}^*exp(-j\phi_n)\} \quad (5)$$

Here, $\eta_n$ is given by $$\eta_n = \sum_{q=1}^{Q} z_{n-q} exp(-j\phi_{n-q}) \quad (6)$$

which is the estimate of the carrier $(2E_s/T)^{1/2}exp(j\theta)$ in Eq. (1), and this value $\eta_n$ is used as a reference signal for coherent detection of the sample sequence $z_n$. For details of the Viterbi algorithm, see literature: Imai, "Coding Theory," Institute of Electronics, Information and Communication Engineers of Japan.

Figure 1:
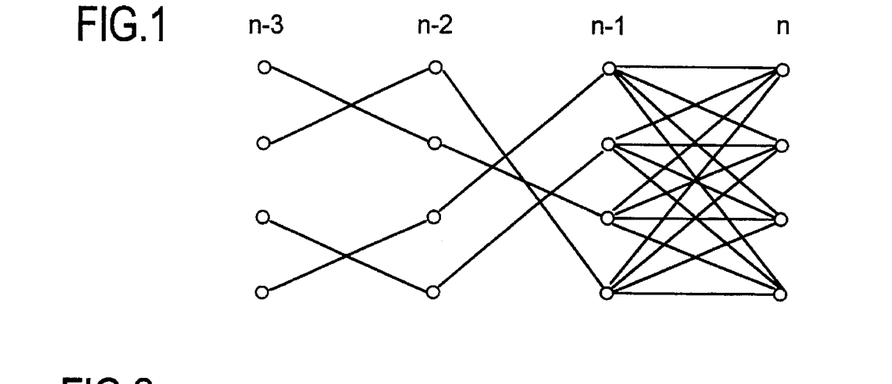
FIG. 1 is a trellis diagram with M=4 and Q=1.

FIG. 1 is a trellis diagram. For brevity, suppose that M=4 and Q=1. Furthermore, survival paths SP that reach the states at time n-1 are assumed to have been determined. Each state $S_n$ at time n is represented by a combination of Q phases $\phi_{n-q}$, where q=0, 1, 2,, ..., Q-1. That is to say, $S_n = \{\phi_{n-q}; q=0, 1, 2, \ldots, Q-1\}$. The number of states is $M^Q$ in total. M paths extend to each state at time n from $M^Q$ states at time n-1 regardless of the value Q. The transition from a certain state $S_{n-1}$ at time n-1 to a certain state $S_n$ at time n is represented by a combination of Q+1 phases $\phi_{n-q}$, where q=0, 1, 2,, ..., Q-1, Q. The branch metric that indicates the likelihood of this transition is calculated on the basis of Eq. (5), and the branch metric thus calculated is added to the path metric $\Lambda(S_{n-1})$ in the state $S_{n-1}$ at time n-1 to obtain the path metric $\Lambda(S_n|S_{n-1})$ of each candidate sequence. Such path metrics are calculated for M states out of the $M^Q$ states $S_{n-1}$ at time n-1 and compared in terms of magnitude to select one path which is most likely to reach one of the states $S_n$ at time n.

Figure 2:
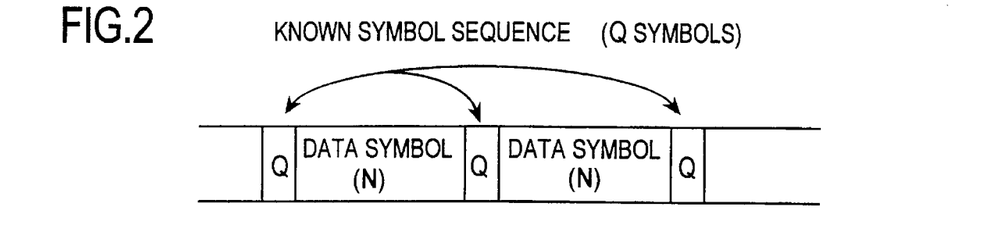
FIG. 2 is a diagram showing an example of a transmit frame configuration.

Let it be assumed that, as shown in FIG. 2, known Q-symbol sequences are periodically inserted every N data symbols to avoid uncertainty of the phase of the decoded data. Even if Q=1 is set as the known sequence, no significant performance degradation occurs. The decoding will be described below in detail.

(a) To select paths most likely to reach the states $S_n$ at time n from the $M^Q$ states $S_{n-1}$ at time n−1, received signal sample sequences $z_{n-q}$; q=0, 1, 2, ..., Q−1, Q, are inversely modulated, in accordance with Eq. (6), by phase sequences $\phi_{n-q}$; q=0, 1, 2, ..., Q−1, Q which constitute the states $S_n$ and $S_{n-1}$, then the inner product of the inversely modulated results with q=0 and the results of summation from q=1 to Q is calculated, and its real part is calculated to obtain a branch metric $\lambda_n(S_{n-1} \rightarrow S_n)$ that indicates the likelihood of the transition from the state $S_{n-1}$ at time n−1 to the state $S_n$ at time n.

In other words, the multiplication of $z_{n-q}$ by $\exp(-j\phi_{n-q})$ is equivalent to the inverse modulation of $z_{n-q}$ by $\phi_{n-q}$; the phase sequences $\phi_{n-q}$ (q=1, 2, ..., Q) constituting the states $S_{n-1}$ are used to inversely modulate the corresponding ones of the received signal sample sequences; $z_{n-q}$, q=1, 2, ... Q, and the value $\eta_n$ obtained by adding together the inversely modulated results is the results of calculation by Eq. (6). The value $\eta_n$ is used as a reference signal for the sample $z_n$ at time n. By multiplying the received sample $z_n$ by $\exp(-j\phi_n)$ to inversely modulate $z_n$ by $\phi_n$, then the inner product of the resulting value and the value $\eta_n$ of Eq. (6) is calculated, and its real part is calculated to obtain the branch metric by Eq. (5).

(b) The branch metric $\lambda_n(S_{n-1} \rightarrow S_n)$ is added to the branch metric $\Lambda(S_{n-1})$ in the state $S_{n-1}$ at time n−1 to obtain the branch metric of each candidate sequence which passes through the state $S_{n-1}$.

(c) The above calculations are repeated for all of the M states $S_{n-1}$ which reach one of the states $S_n$ at time n, by which path metrics for M candidate sequences are calculated, and the path metrics are compared in terms of magnitude to obtain the state $S_{n-1}'$ which provides the maximum path metric. This state is stored in a path memory as the state of a path at time n−1 which is most likely to reach the states $S_n$ at time n, and at the same time, its path metric $\Lambda(S_n|S_{n-1}')$ is stored as a path metric $\Lambda(S_n)$ in the states $S_n$ at time n.

(d) The above calculations are repeated for all the $M^Q$ states at time n to obtain survival paths and their path metrics. In this instance, however, since the state of the known Q-symbol sequence is specified as the only one state composed of Q symbols, only a path that reaches the above-said only one state is regarded as a survival at the time of receiving the known pilot sequence (consequently, only one path survives at this time) and the others are excluded.

(e) The path metrics in all of the $M^Q$ states at time n are compared in terms of magnitude to obtain a state $S_n'$, then the path memory is traced back for a fixed number D of points in time from the state $S_n'$, and the phase $\phi_{n-D}$ that constitutes the state $S_{n-D}$ reached is outputted as a decoded symbol $\phi_{n-D}$, where D is an integer equal to or greater than N.

Figure 3:
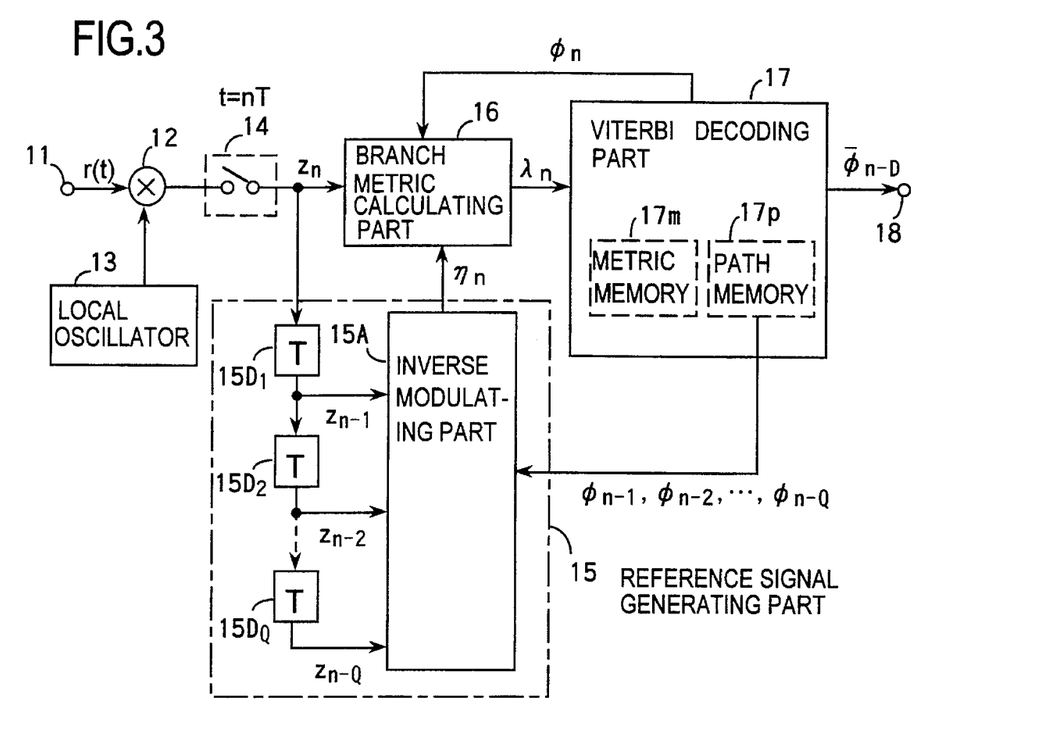
FIG. 3 is a block diagram illustrating an example of a coherent detection receiver in accordance with a first embodiment of the present invention.

FIG. 3 illustrates an example of a receiver embodying the method of the first embodiment. A received wave r(t) from an input terminal 11 is fed to a quasi-coherent detector 12, wherein it is quasi-coherently detected by being multiplied by a local signal from a local signal oscillator 13, and the resulting received signal z(t) of the intermediate frequency (or base band) is sampled by a sampling circuit 14 with a fixed period (a symbol period T) to obtain a complex sample $Z_n$ of the received signal z(t). The complex sample is provided to a reference signal generating part 15, wherein it is inputted into a series circuit of delay circuits $15D_1$ to $15D_Q$ each having a delay T, from which 1- to Q-symbol delayed samples $\{Z_{n-q}; q=1, 2, ..., Q\}$ are provided to an inverse modulating part 15A. The inverse modulating part 15A calculates the reference signal $\eta_n$ by Eq. (6) from phase sequences $\phi_{n-1}$ to $\phi_{n-Q}$ provided from a Viterbi decoding part 17 and the above-mentioned delayed samples $Z_{n-1}, ..., Z_{n-Q}$ and applies the reference signal to a branch metric calculating part 16. The branch metric calculating part 16 calculates, by Eq. (5), the branch metric $\lambda_n$ that reaches each state $S_n$ at time n, using the reference signal $\eta_n$ calculated for each phase sequence and M phases $\phi_n$ provided from the Viterbi decoding part 17, the branch metric thus obtained being provided to the Viterbi decoding part 17. The Viterbi decoding part 17 is provided with a path memory 17p and path metric memory 17m. The Viterbi decoding part 17 performs the processes (b) to (e) and provides via a terminal 18 decoded data obtained by the processes.

Figure 4:
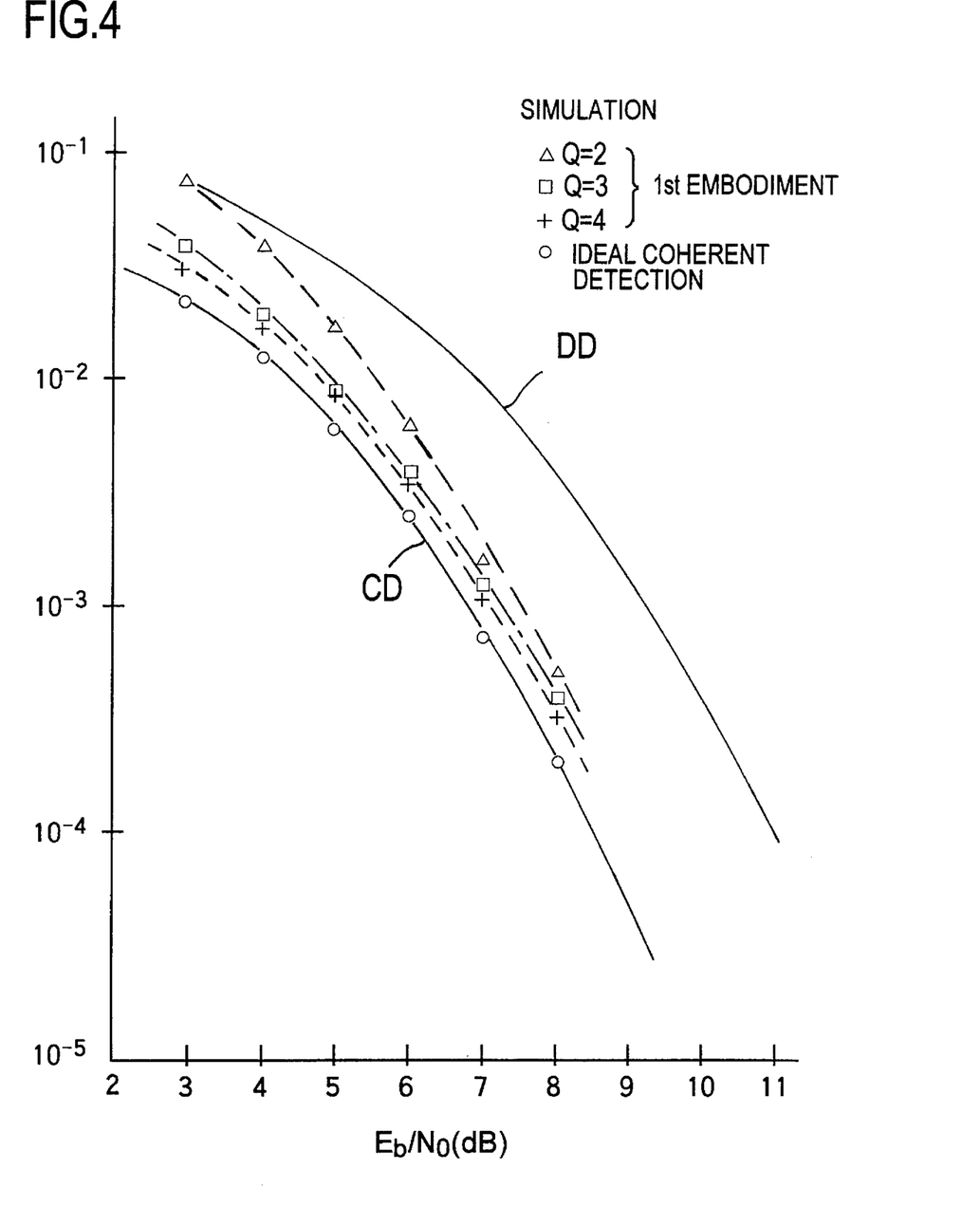
FIG. 4 is a graph showing the error rate performance of the first embodiment and theoretical error rate performance obtained with differential detection and ideal coherent detection.

In FIG. 4 there are shown the results of computer simulations of the error rate performance in the case where the first embodiment of the present invention is applied to a four-phase PSK system. The abscissa represents the signal energy per bit versus noise power density ratio $E_b/N_o$. For comparison, there are also plotted the results of simulation of the error rate by ideal coherent detection and differential detection. In the case of using the differential detection, it is necessary that the data to be transmitted be represented by phase difference $\phi_n - \phi_{n-1}$. The solid lines in FIG. 4 indicate theoretical values. The difference between the differential detection and the ideal coherent detection in the required $E_b/N_o$ for achieving an error rate of 0.1% is 2.4 dB, but by setting Q=3, the performance of the present invention can be improved 2.05 dB, that is, the difference in the above-mentioned required $E_b/N_o$ can be reduced down to 0.35 dB. By increasing the amount of calculation and setting Q=4, the difference could be reduced down to 0.25 dB.

Second Embodiment

The first embodiment described above uses $M^Q$ states in the Viterbi decoding and a total of Q+1 phases $\phi_n$ to $\phi_{n-Q}$ in the calculation of branch metrics. While this improves the error rate performance with an increase in the value Q, the number of states $M^Q$ increases exponentially, causing an exponential increase in the amount of processing required. Now, a description will be given, with reference to FIG. 5, of an embodiment further improved in this respect.

Figure 5:
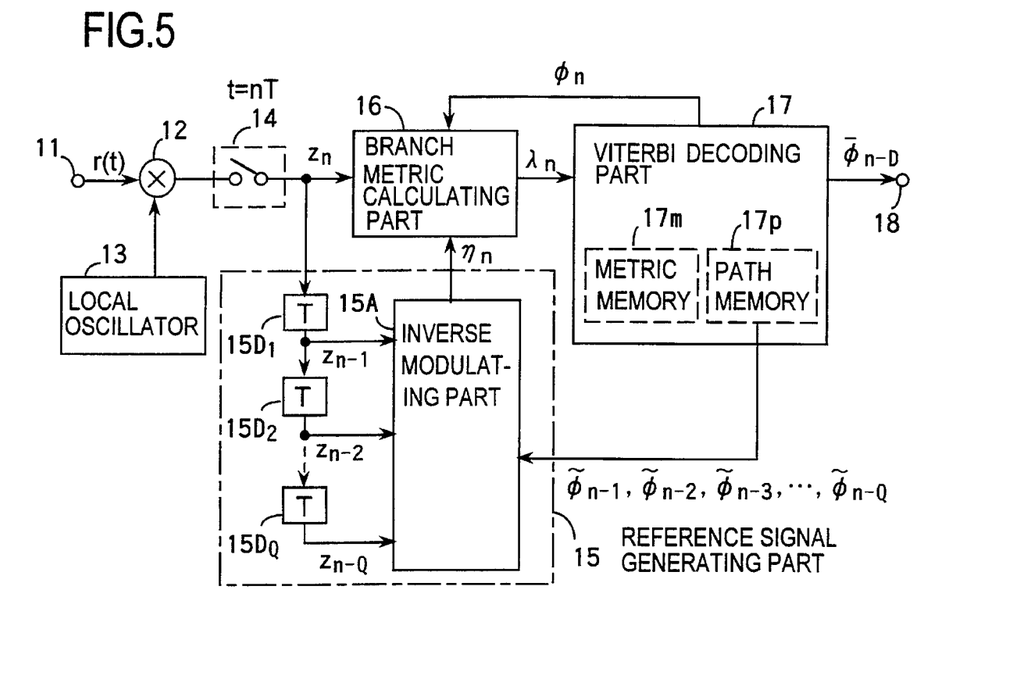
FIG. 5 is a block diagram illustrating an example of a coherent detection receiver in accordance with a second embodiment of the invention.

This embodiment is common to the first embodiment in the basic operation for decoding by the Viterbi decoding algorithm but differs from the latter in that the amount of calculation is reduced by using M states of the same number as that of modulation levels and by representing the states at time n by $\phi_n$ alone. As referred to previously, the reference signal $\eta_n$ used at time n is the sum of samples obtained by inversely modulating the received signal samples $Z_{n-1}, ..., Z_{n-Q}$ at times n−1 to n−Q by the phase sequences $\phi_{n-1}, ..., \phi_{n-Q}$ as will be seen from Eq. (6). In this second embodiment, at the time of calculating the branch metrics from the states $S_{n-1}$ at time n−1 to the states $S_n$ at time n, Q−1 phases are traced back along each of the survival paths to the states $S_{n-1}$ at time n−1 already stored in the path memory 17p, by which phases $\phi_{n-2|n-1}, ..., \phi_{n-Q|n-1}$ are obtained. The Q−1 phases thus obtained are substituted into Eq. (6) to calculate, by the following equation, the reference signal $\eta_n$ for the survival path that reaches each state $S_{n-1}$:

$$\eta_n = z_{n-1}\exp(-j\phi_{n-1}) + \sum_{q=2}^{Q} z_{n-q}\exp(-j\tilde{\phi}_{n-q|n-1}) \quad (7)$$

With this method, it is possible to bring the error rate close to that of the ideal coherent detection by increasing the number of phases to be traced back while reducing the number of states to M (that is, reducing the number of branch metric calculations).

The receiver of FIG. 5, which employs the method of this embodiment, differs from the receiver of FIG. 3 in that the inverse modulating part 15A traces back each of only the survival paths to the states $S_{n-1}$ at time n−1, then reads out Q−1 phases $\phi_{n-2}, \ldots, \phi_{n-Q}$ from the path memory 17p of the Viterbi decoding part 17 for each path and calculates the reference signal $\eta_n$ by Eq. (7). The branch metric calculating part 16 uses the reference signal to calculate the branch metric $\lambda_n$ by Eq. (5). The processing by this embodiment will be described below.

(a) The Viterbi decoding part 17 traces back survival paths to the states $S_{n-1}$ at time n−1 to obtain Q−1 phases $\phi_{n-2|n-1}$ to $\phi_{n-Q|n-1}$ and provides them to the reference signal generating part 15 together with the phase $\phi_{n-1}$, and the reference signal generating part 15 calculates, by Eq. (7), the reference signal $\eta_n$ for each path that passes through one of the states $S_{n-1}$.

(b) At the time of selecting the path most likely to reach the state $S_n$ at time n from M phase states at time n−1, the branch metric calculating part 16 calculates, by Eq. (5), the branch metric $\lambda(S_{n-1} \to S_n)$ that represents the likelihood of the transition from the state $S_{n-1}$ at time n−1 to the state $S_n$ at time n, on the basis of the reference signal $\eta_n$ and the received signal sample $Z_n$.

(c) In the Viterbi decoding part 17, the branch metric $\lambda(S_{n-1} \to S_n)$ is added to the path metric $H(S_{n-1})$ in the state $S_{n-1}$ at time n−1 to obtain the path metric $H(S_n|S_{n-1})$ of the candidate sequence that passes through the state $S_{n-1}$.

(d) The above calculations are repeated for each of the M states $S_{n-1}$ to obtain path metrics for M candidate sequences, the path metrics are compared in terms of magnitude to obtain a state $S_{n-1}'$ that provides the maximum path metric. This path metric is stored in the path memory 17p as the state of a path at time n−1 that is most likely to reach the state at time n and its path metric $H(S_n|S_{n-1}')$ is stored in the metric memory 17m as a path metric $H(S_n)$ in the state $S_n$ at time n.

(e) The Viterbi decoding part 17 repeats the above calculations for all of the M states at time n to obtain M path metrics, compares them in terms of magnitude to obtain the state $S_n'$ of the maximum path metric, traces back the path memory by a fixed number D of points in time from the state $S_n'$ and outputs the reached state as the decoded symbol phase $\phi_{n-D}$.

Third Embodiment

In the second embodiment described above, the reference signal $\eta_n$ for the decision at time n may also be calculated as given below by using only one survival path and a decoded symbol phase sequence $(\bar{\phi}_{n-1}, \bar{\phi}_{n-2}, \ldots, \bar{\phi}_{n-Q})$ from time n−Q to n−1.

$$\eta_n = \sum_{q=1}^{Q} z_{n-q}\exp(-j\bar{\phi}_{n-q}) \quad (8)$$

Figure 6:
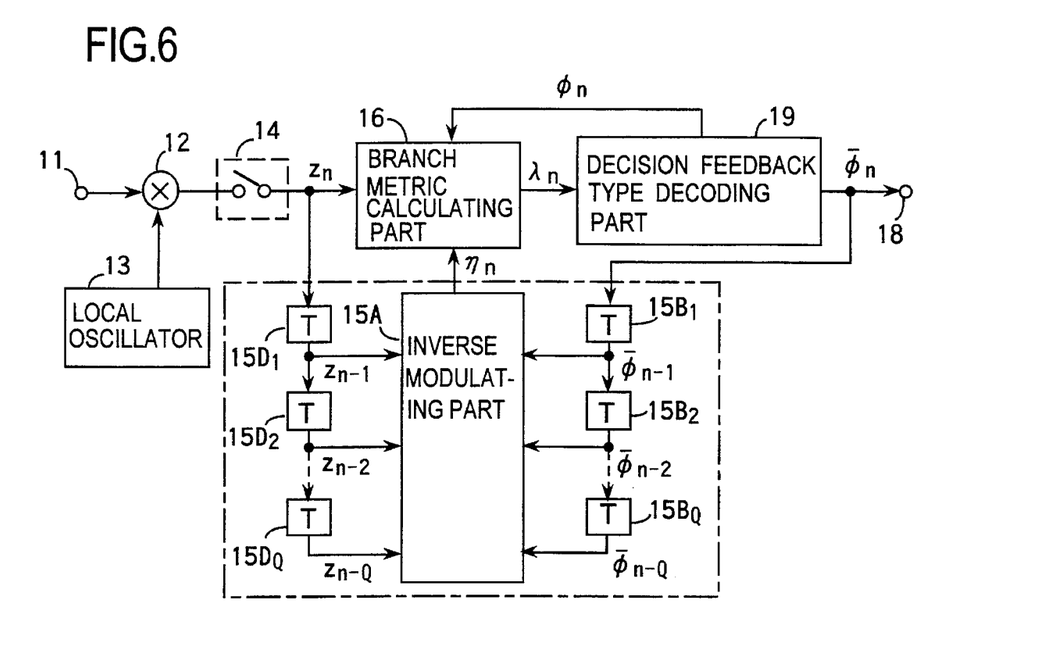
FIG. 6 is a block diagram illustrating an example of a coherent detection receiver in accordance with a third embodiment of the invention.

That only one path is a survival path means that the path is used as the phase sequence of the decoded results. As depicted in FIG. 6, the receiver in this instance performs decoding in such a manner as to minimize an error in the decoding of the received signal sample $z_n$ at the current time n by the use of a decision feedback type decoding part 19, not the decoding by the maximum likelihood sequence estimation based on the Viterbi algorithm. The reference signal generating part 15 is provided with Q series-connected delay stages $15B_1$ to $15B_Q$ each having a delay of the symbol period T, and the series delay circuit is being supplied with the decoded results $\bar{\phi}_n$. Consequently, decoded symbol phases $\bar{\phi}_{n-1}, \bar{\phi}_{n-2}, \ldots, \bar{\phi}_{n-Q}$ are provided from respective delay stages to the inverse modulating part 15A, which calculates the reference signal $\eta_n$ by Eq. (8) from such a decoded symbol phase sequence and the received signal sample sequence $z_{n-1}, z_{n-2}, \ldots, z_{n-Q}$ and provides the reference signal to the branch metric calculating part 16. This reference signal is determined unequivocally by the received signal sample sequence $z_{n-1}$ to $z_{n-Q}$ and the decoded symbol phase sequence from $\bar{\phi}_{n-1}$ to $\bar{\phi}_{n-Q}$. The branch metric calculating part 16 calculates the branch metric $\lambda_n$ by Eq. (5) and outputs it, and the decision feedback type decoding part 19 outputs as the decoded symbol phase $\phi_n$ the phase $\phi_n$ which maximizes the branch metric $\lambda_n$.

Fourth Embodiment

This embodiment omits the trace-back step in the second embodiment to further cut the amount of processing involved. This embodiment introduces a forgetting factor $\mu(0\leq\mu\leq 1)$ into Eq. (7), by which the older the time n, the less the contribution to the reference signal $\eta_n$. That is, the following equation is used to compute the reference signal $\eta_n$ of each path that passes through the state $S_{n-1}$, and the phases $\phi_{n-2|n-1}$ to $\phi_{n-Q|n-1}$ constitute the phase sequence on each survival path to the state $S_{n-1}$ at time n−1.

$$\eta_n = z_{n-1}\exp(-j\phi_{n-1}) + \sum_{q=2}^{Q} \mu^{q-1}z_{n-q}\exp(-j\tilde{\phi}_{n-q|n-1}) \quad (9)$$

Thus, Eq. (9) can be simplified as follows:

$$\eta_n = z_{n-1}exp(-j\phi_{n-1}) + \mu\eta_{n-1} \quad (10)$$

Since the reference signals $\eta_n$ in the states $S_{n-1}$ can sequentially be calculated using reference signals $\eta_{n-1}$ in the states $S_{n-2}$ at the immediately preceding time n−2 on the survival paths as mentioned above, the amount of processing required can be made smaller than in the case of the second embodiment.

Figure 7:
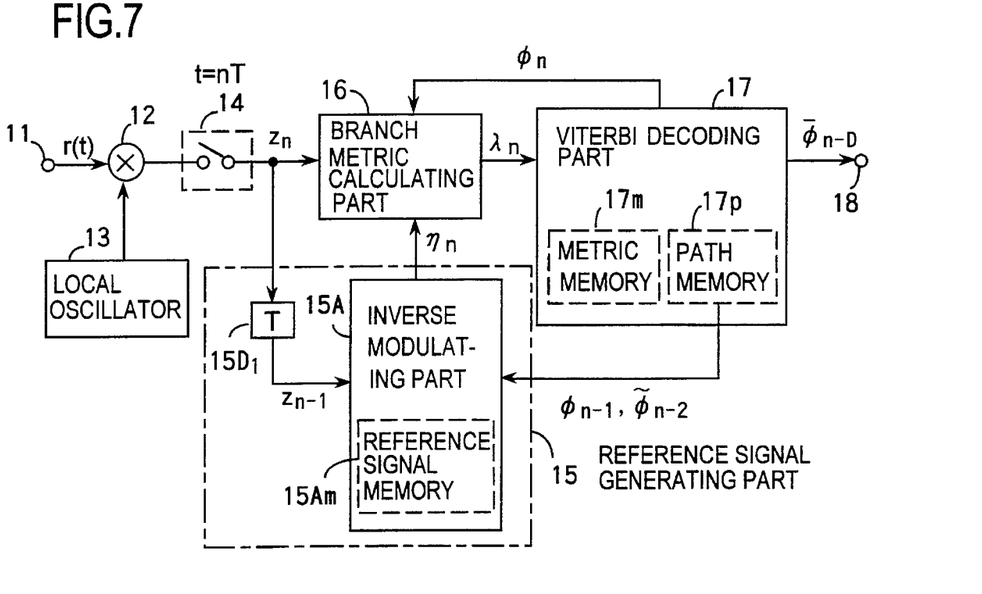
FIG. 7 is a block diagram illustrating an example of a coherent detection receiver in accordance with a fourth embodiment of the invention.

As shown in FIG. 7, the receiver that employs the method of the fourth embodiment can be formed by using only the delay stage $15D_1$ of the reference signal generating part 15 in FIG. 5 and providing a reference signal memory 15Am in the inverse modulating part 15A which stores the immediately preceding reference signal $\eta_{n-1}$. The inverse modulating part 15A reads out of the path memory 17p the reference signal in the state $S_{n-2}$ by tracing back the surviving path that reaches the state $S_{n-1}$ and uses it to calculate the reference signal $\eta_n$ at time n by Eq. (10). The other remaining parts are identical in operation with those in the case of FIG. 5.

Fifth Embodiment

In the above-described fourth embodiment, the reference signal $\eta_n$ at time n is calculated by the following equation, using only one survival path and the decoded symbol phase $\bar{\phi}_{n-1}$ at time n−1 alone.

$$\eta_n = z_{n-1} exp(-j\bar{\phi}_{n-1}) + \mu \eta_{n-1} \tag{11}$$

Figure 8:
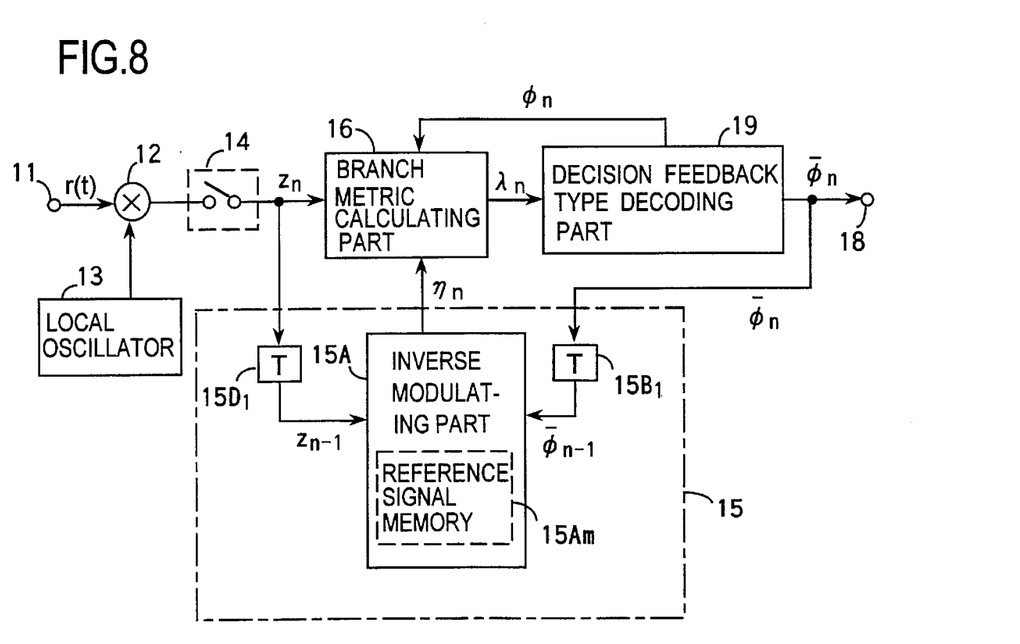
FIG. 8 is a block diagram illustrating an example of a coherent detection receiver in accordance with a fifth embodiment of the invention.

As depicted in FIG. 8, the receiver in this case also employs the decision feedback type decoding part 19 as is the case with the FIG. 6 embodiment and the decoded symbol $\bar{\phi}_{n-1}$ at time n−1 is provided from the delay stage 15B$_1$ to the inverse modulating part 15A. The inverse modulating part 15A calculates the reference signal $\eta_n$ by Eq. (11), using the immediately preceding reference signal $\eta_{n-1}$ stored in the reference signal memory 15Am, the decoded symbol phase $\bar{\phi}_{n-1}$ and the received signal sample $z_{n-1}$, the reference signal thus calculated being fed to the branch metric calculating part 16. The other operations are the same as in the case of the FIG. 7 embodiment.

Figure 9:
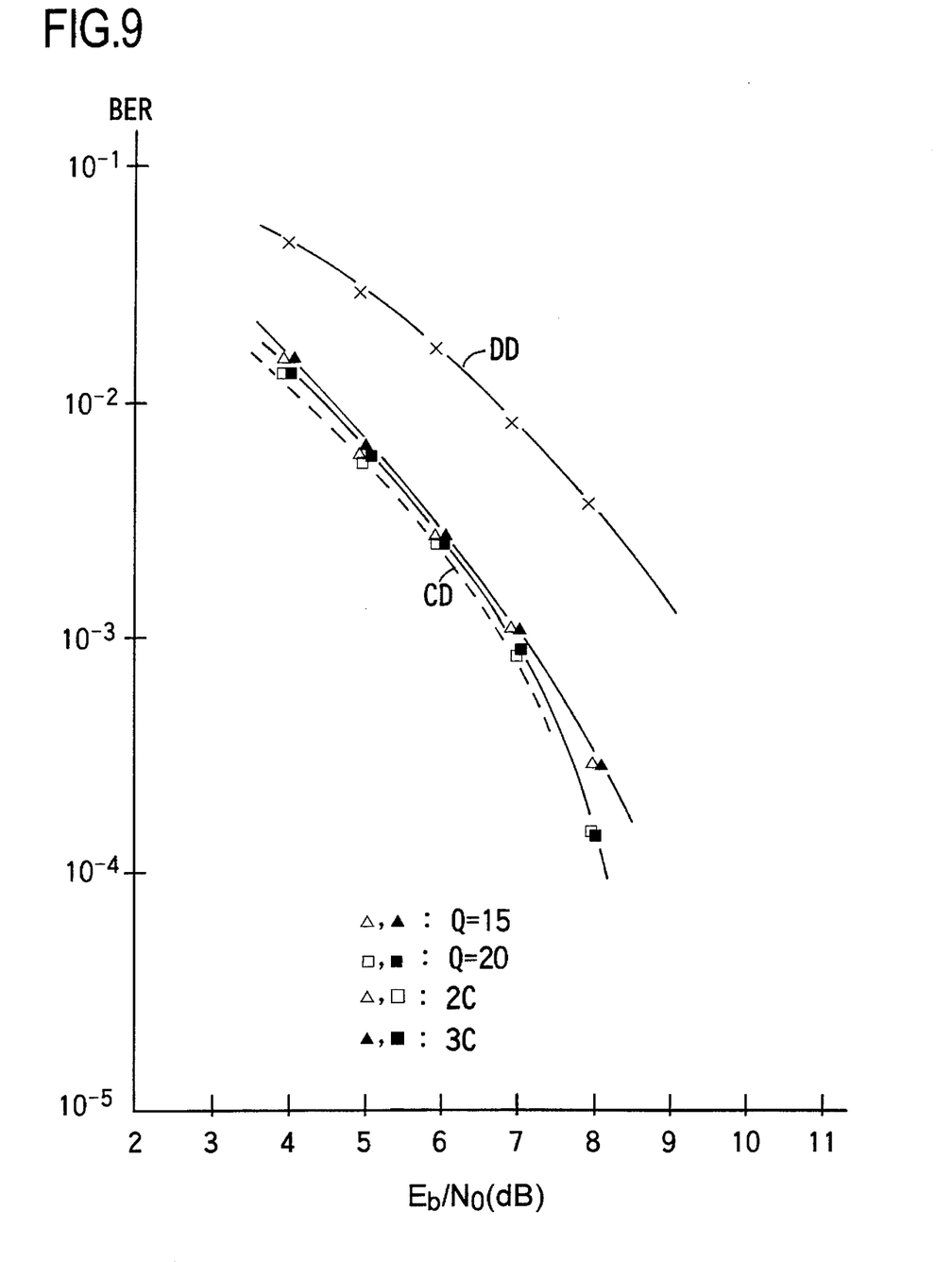
FIG. 9 is a graph showing error rate performance of the second and third embodiments obtained by computer simulations.
Figure 10:
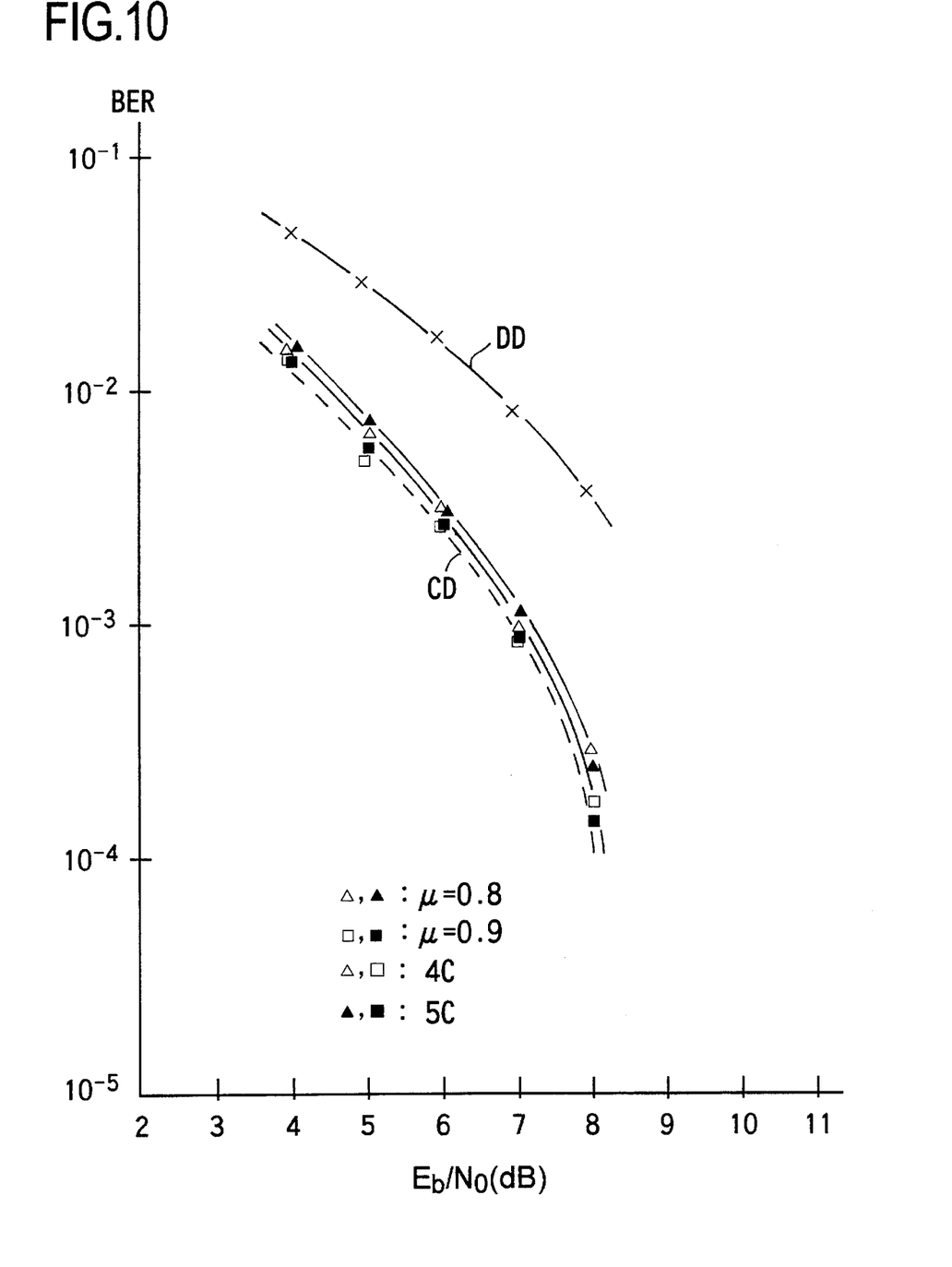
FIG. 10 is a graph showing error rate performance of the fourth and fifth embodiments obtained by computer simulations.

In FIGS. 9 and 10 there are shown the results of computer simulations of the four-phase PSK in the second through fifth embodiments. In the computer simulations a one-symbol non-modulated pilot was inserted in 16 symbols to let the receiving side to know the absolute phase of modulation.

In FIG. 9 the curves 2C and 3C are error rate performance of the second and third embodiments under no fading environment. The abscissa represents the signal energy per bit versus noise power density ratio $E_b/N_o$. For comparison, there are shown performance of the ideal coherent detection (CD) and differential detection (DD). Setting Q=20 symbols, the difference between the performances of the ideal coherent detection and the present invention can be reduced down to 0.5 dB or less. In FIG. 10 the curves 4C and 5C indicate error rate performances of the fourth and fifth embodiments under no fading environment. Setting $\mu$=0.9, it is possible to obtain substantially the same performances as those of the second and third embodiments. The amount of processing involved decreases in the order of second>fourth>third>fifth embodiment.

Incidentally, in mobile communications, transmitted signals are received after being reflected by buildings, so that when a mobile station performs transmission and reception while moving, multipath fading occurs in the received signals and a random phase rotation in the received signals causes a decision error. The following embodiments will be described in connection with examples of coherent detection methods respectively employing a linear prediction scheme for obtaining a reference signal having removed therefrom the random phase rotation and an adaptive prediction coefficient control scheme in the coherent detection of an M-level phase modulated signals and a transmitted symbol sequence estimation scheme.

Sixth Embodiment

Figure 11:
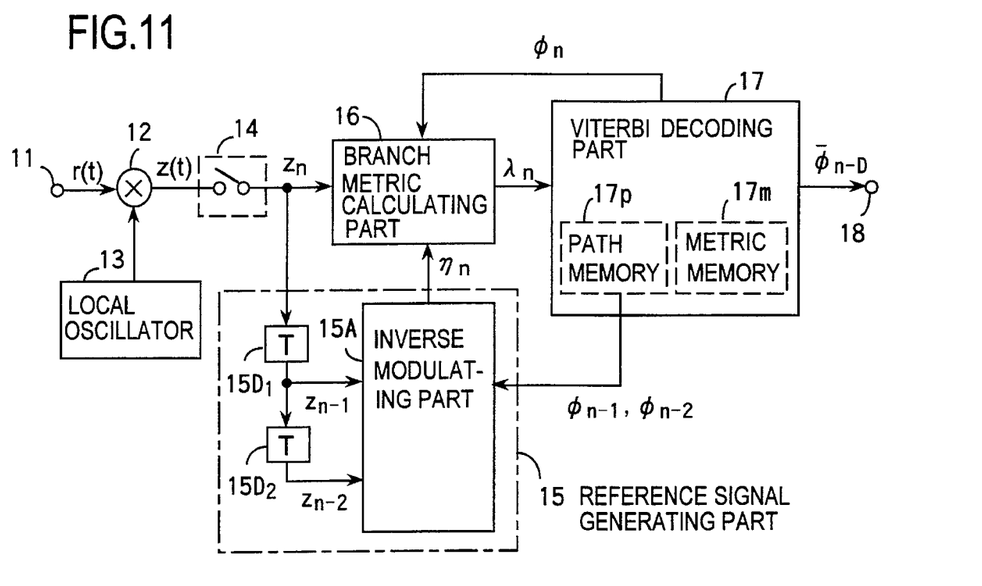
FIG. 11 is a block diagram illustrating an example of a coherent detection receiver in accordance with a sixth embodiment of the invention.

Illustrated in FIG. 11 is an example of the receiver configuration that utilizes the method of the sixth embodiment. In this embodiment, the states at each time n are defined, for example, as $M^2$ states that are represented by two phases ($\phi_n$, $\phi_{n-1}$) at time n and n−1 immediately preceding it. When Q=4, the trellis diagram of FIG. 1, which represents the state transition in this embodiment, is equivalent to the case where $M^2$=16 in FIG. 1, showing that survival paths are decided up to time n−1 and how survival paths to respective states at time n are decided. The branch metric calculating part 16 calculates the branch metric that indicates the likelihood of transition from the state $S_{n-1}$ at the immediately preceding time to the state $S_n$ at time n. The viterbi decoding part 17 sequentially estimates transmitted phase sequences by the Viterbi algorithm. The reference signal adaptive prediction part 15 predicts the reference signal from which variations in the received signal by fading have been removed.

The sixth embodiment is characterized by the estimation of the transmitted phase sequence by the Viterbi algorithm using, as the branch metric, a square error between a candidate signal calculated from the reference signal $\eta_n$ and the received signal sample $z_n$ and by the adaptive prediction of the reference signal from the received signal sample sequence. The Viterbi decoding part 17 uses the branch metric to calculate, for each state at time n, the path metric that indicates the likelihood of the sequence which reaches the state, then selects the state at the immediately preceding time from which the path most likely to reach each state at time n originates, and stores, for each state, the path history and the path metric in the path memory 17p and the metric memory 17m, respectively. And, the Viterbi decoding part traces back the path of the minimum one of the path metrics in the $M^2$ states at time n by the fixed number D of point in time and outputs the decoded symbol phase $\phi_{n-D}$.

The sequence estimation algorithm according to the present invention described above involves such steps as listed below.

(a) At time n there are $M^2$ states $S_n$ represented by two consecutive phases ($\phi_n$, $\phi_{n-1}$). When the Viterbi decoding part 17 selects from the states $S_{n-1}$ at time n−1 the state transition that is most likely to reach one of the states $S_n$ at time n, the reference signal adaptive prediction part 15 represents the reference signal by the following equation using a real-number prediction coefficient $\alpha$ and calculates it by linear prediction.

$$\eta_n = (1+\alpha)z_{n-1}exp(-j\phi_{n-1}) - \alpha z_{n-2}exp(-j\phi_{n-2}) \tag{12}$$

(b) Next, the branch metric calculating part 16 uses, as a candidate signal of the received signal at time n, a signal phase-rotated $\phi_n$ from the reference signal $\eta_n$ and calculates the following square error between it and the received signal sample $z_n$ as the branch metric $\lambda(S_{n-1} \to S_n)$ indicating the likelihood of the transition from the state $S_{n-1}$ at time n−1 to the sate $S_n$ at time n.

$$\lambda(S_{n-1} \to S_n) = |z_n - \eta_n exp(j\phi_n)|^2 \tag{13}$$

(c) The branch metric $\lambda(S_{n-1} \to S_n)$ is added to the path metric $H(S_{n-1})$ in the state $S_{n-1}$ at time n−1 to obtain the path metric $H(S_n|S_{n-1})$ of a candidate sequence that passes through the state $S_{n-1}$.

(d) The above calculations are repeated for all of the $M^2$ states $S_{n-1}$ at time n−1 to obtain the path metrics for $M^2$ candidate sequences, which are compared in terms of magnitude to obtain the state $S_{n-1}'$ of the minimum path metric. This state is stored in the path memory 17p as the state at time n−1 of the survival path which reaches the state $S_n$ at time n, while at the same time its path metric $H(S_n|S_{n-1}')$ is stored in the metric memory 17m as the path metric $H(S_n)$ in the state $S_n$ at time n.

(e) The above calculations are repeated for all of the $M^2$ states at time n to obtain $M^2$ path metrics, which are compared in terms of magnitude to obtain the state $S_n'$ of the minimum path metric. The path memory 17p is traced the fixed number D of points in time back from the state $S_n'$ and the phase $\phi_{n-D}$ that constitutes the state thus reached is outputted as the decoded symbol phase $\phi_{n-D}$.

Seventh Embodiment

In the above-described sixth embodiment there are $M^2$ survival paths at each time, but in the seventh embodiment each state $S_n$ at time n is represented by one phase $\phi_n$. By this, M survival paths are provided at each point in time. The basic decoding operation by the Viterbi algorithm is the same as in the FIG. 11 embodiment, but the reference signal $\eta_n$ is calculated by the following equation using the phase $\phi_{n-2|n-1}$ at the immediately preceding time on the survival path whose final state is $\phi_{n-1}$.

$$\eta_n = (1+\alpha)z_{n-1}\exp(-j\phi_{n-1}) - \alpha z_{n-2}\exp(-j\tilde{\phi}_{n-2|n-1}) \quad (14)$$

Figure 12:
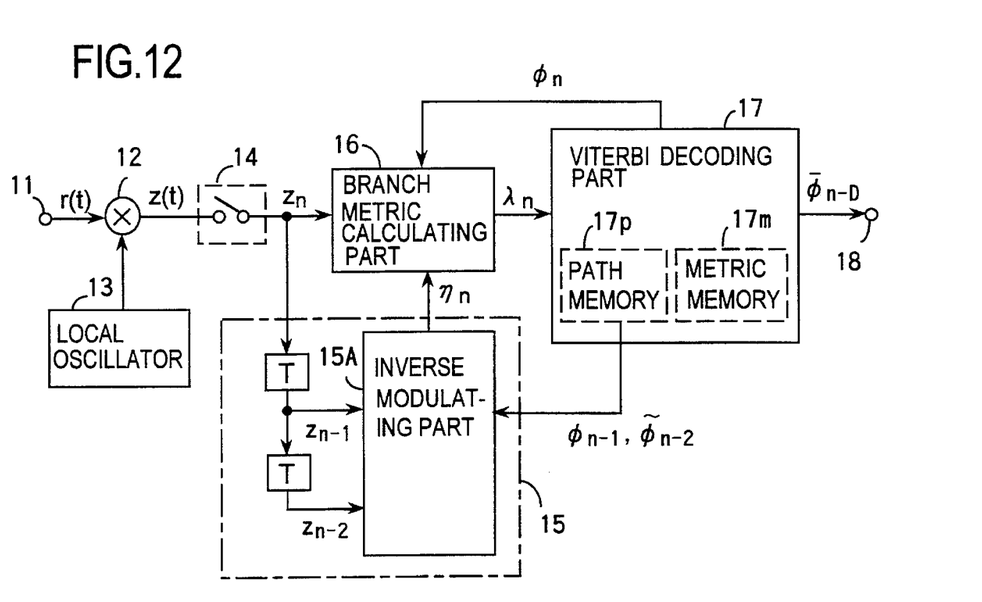
FIG. 12 is a block diagram illustrating an example of a coherent detection receiver in accordance with a seventh embodiment of the invention.

The receiver configuration in this instance is shown in FIG. 12, in which instead of generating all candidates for the two phases $(\phi_{n-1}, \phi_{n-2})$ representing the $M^2$ states at time n−1 in the FIG. 11 embodiment, the phase $\phi_{n-1}$ and the subsequent phase $\phi_{n-2}$ at time n−2 on the survival path are read out of the path memory 17p of the Viterbi decoding part 17 and inputted into the inverse modulating part 15A. The inverse modulating part 15A uses the phases $\phi_{n-1}$ and $\phi_{n-2}$ and the received signal samples $z_{n-1}$ and $z_{n-2}$ to calculate the reference signal $\eta_n$ by Eq. (14). The other operations are the same as in the FIG. 11 embodiment.

Eighth Embodiment

Figure 13:
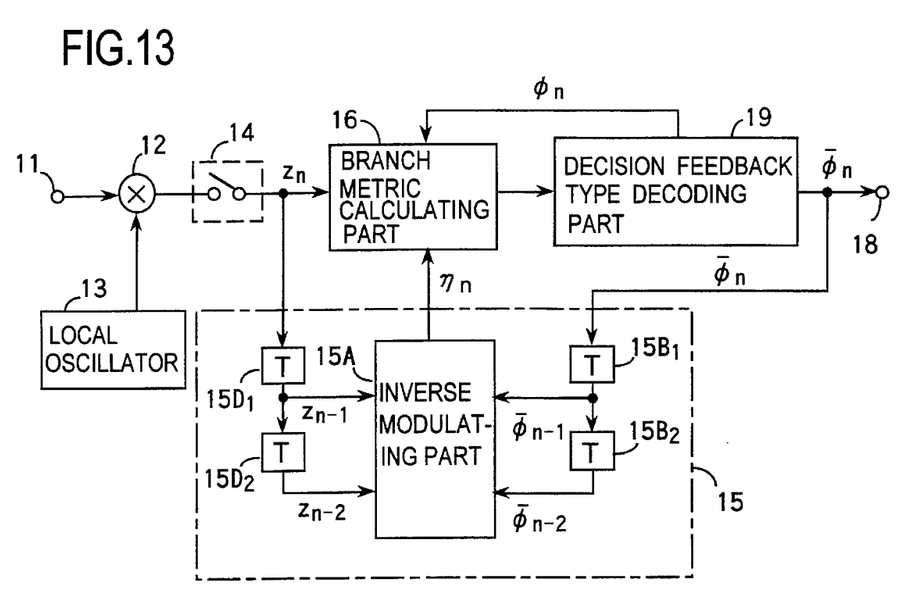
FIG. 13 is a block diagram illustrating an example of a coherent detection receiver in accordance with an eighth embodiment of the invention.

While in the FIG. 12 embodiment there are M survival paths at each point in time, the eighth embodiment provides only one survival path at each point in time so as to further reduce the amount of processing involved. To this end, the decoding part does not employ the decoding scheme by the Viterbi algorithm but performs decoding by the decision feedback algorithm that makes a symbol decision for each point in time as in the case of the FIG. 8 embodiment. The receiver configuration in this case is shown in FIG. 13.

The decoding steps are such as listed below.

(a) In the inverse modulating part 15A the reference signal $\eta_n$ is calculated by the following equation using decoded symbol phases $\bar{\phi}\phi_{n-1}$ and $\bar{\phi}_{n-2}$ corresponding to two previous decoded symbols.

$$\eta_n = (1+\alpha)z_{n-1}\exp(-j\bar{\phi}_{n-1}) - \alpha z_{n-2}\exp(-j\bar{\phi}_{n-2}) \quad (15)$$

(b) As is the case with Eq. (5), in the branch metric calculating part 16 the reference signal $\eta_n$ is phase rotated by $\phi_n$, the phase-rotated signal is used as a candidate for the signal received at time n, and the real number value of the inner product of the received signal candidate and the received signal sample $z_n$ is set as the branch metric value $\lambda(S_{n-1} \to S_n)$ indicating the likelihood of the transition from the previously determined state $S_{n-1}$ at time n−1 to the state $S_n$ at the current time n.

$$\lambda(S_{n-1} \to S_n) = Re[z_n \eta_n^* \exp(-j\phi_n)] \quad (16)$$

(c) This calculation is repeated for all the phases $\phi_n$ and the resulting values are compared in terms of magnitude to obtain the phase $\phi_n$ which provides the maximum branch metric, which is outputted as the decoded symbol phase $\phi_n$.

In the sixth to eighth embodiments, the prediction coefficient $\alpha$ for predicting the reference signal for use at time n can be adaptively determined in such a manner as to minimize the error between the received signal sample and the corresponding linearly predicted value, for example, by tracing back the phase sequence on the survival path which is connected to each state $S_{n-1}$ at time n−1. As the result of this, each survival path has its own prediction coefficient. Letting the sequence on the survival path be represented by $\bar{\phi}_{n-1-i}$ (where i=0, 1, ..., n−1), the prediction coefficient $\alpha(\bar{\phi}_{n-1})$ for predicting the reference signal that is used at time n is selected in such a manner as to minimize a mean square error of an exponential weight that is given by the following equation:

$$J = \sum_{i=0}^{n-1} \beta^i |z_{n-1-i}\exp(-j\tilde{\phi}_{n-1-i}) - \eta'_{n-1-i}|^2 \quad (17)$$

where $\beta$ is a forgetting factor equal to or smaller than 1. $\eta'_{n-1-i}$ is a reference signal at time n−1−i predicted using the same prediction coefficient $\alpha(\bar{\phi}_{n-1})$ at all previous points in time and it is given by the following equation:

$$\eta'_{n-1-i} = \{1+\alpha(\bar{\phi}_{n-1})\}z_{n-2-i}\exp(-j\tilde{\phi}_{n-2-i}) - \alpha(\bar{\phi}_{n-1})$$
$$z_{n-3-i}\exp(-j\tilde{\phi}_{n-3-i}) \quad (18)$$

The prediction coefficient $\alpha(\bar{\phi}_{n-1})$ that minimizes Eq. (18) is as follows:

$$\alpha(\bar{\phi}_{n-1}) = \quad (19)$$

$$Re\left[\sum_{i=0}^{n-2}\beta^i\{z_{n-1-i}\exp(-j\tilde{\phi}_{n-1-i}) - z_{n-2-i}\exp(-j\tilde{\phi}_{n-2-i})\} \times \right.$$

$$\left.\{z_{n-2-i}\exp(-j\tilde{\phi}_{n-2-i}) - z_{n-3-i}\exp(-j\tilde{\phi}_{n-3-i})\}^*\right] \div$$

$$\sum_{i=0}^{n-2}\beta^i|z_{n-2-i}\exp(-j\tilde{\phi}_{n-2-i}) - z_{n-3-i}\exp(-j\tilde{\phi}_{n-3-i})|^2$$

This can be obtained sequentially. That is, $$\alpha(\bar{\phi}_{n-1}) = \Theta_{n-1}(\bar{\phi}_{n-1})/\Omega_{n-1}(\bar{\phi}_{n-1}) \quad (20)$$

$$\Omega_{n-1}(\bar{\phi}_{n-1}) = |z_{n-2}\exp(-j\tilde{\phi}_{n-2}) - z_{n-3}\exp(-j\tilde{\phi}_{n-3})|^2 + \beta\Omega_{n-2}(\bar{\phi}_{n-2})$$

$$\Theta_{n-1}(\bar{\phi}_{n-1}) = Re[\{z_{n-1}\exp(-j\tilde{\phi}_{n-1}) - z_{n-2}\exp(-j\tilde{\phi}_{n-2})\} \times$$
$$\{z_{n-2}\exp(-j\tilde{\phi}_{n-2}) - z_{n-3}\exp(-j\tilde{\phi}_{n-3})\}^*] + \beta\Theta_{n-2}(\bar{\phi}_{n-2})$$

where $\Omega_0(\phi_0)$ is a small positive number and $\Theta_0(\phi_0)=0$, and $z_{31\ 1}=0$.

Figure 14:
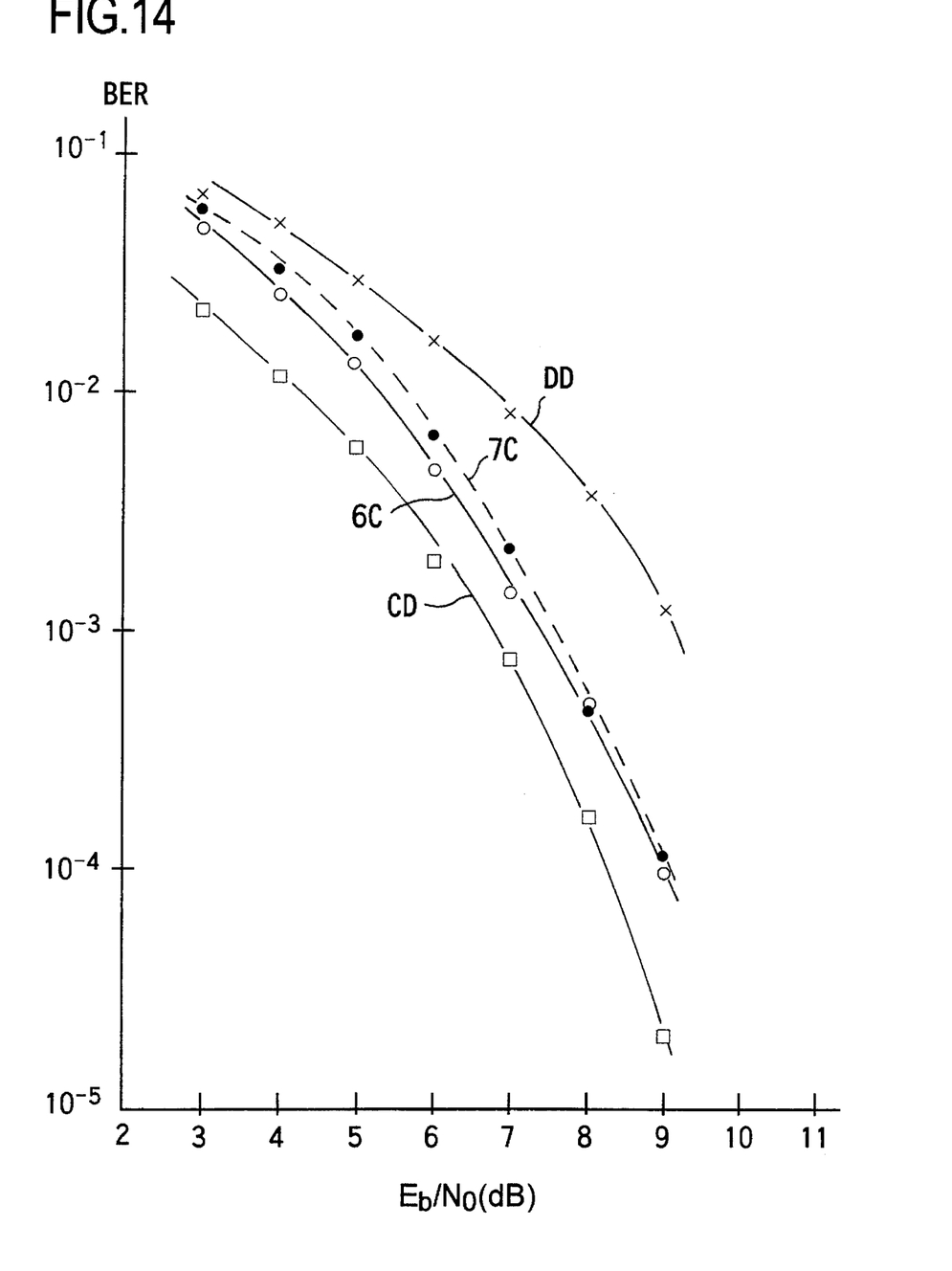
FIG. 14 is a graph showing error rate performance of sixth and seventh embodiments of the invention.

In FIG. 14 there are indicated by the curves 6C and 7C the results of computer simulations of the error rate performances under no fading environment in the cases where the prediction coefficient $\alpha$ is determined by Eq. (17) with $\beta=1$ and the sixth and seventh embodiments are applied to the four-phase PSK. The abscissa represents the signal energy per bit versus noise power density ratio $E_b/N_o$. For comparison, there are also shown ideal coherent detection performance CD and the differential detection performance DD. The performance 6C by the sixth embodiment is close to the ideal coherent detection performance within about 1 dB. The difference between the performance 7C by the seventh embodiment and the ideal coherent detection performance is around 1.5 dB. The amount of processing involved in the seventh embodiment is approximately ¼ that in the sixth embodiment.

Figure 15:
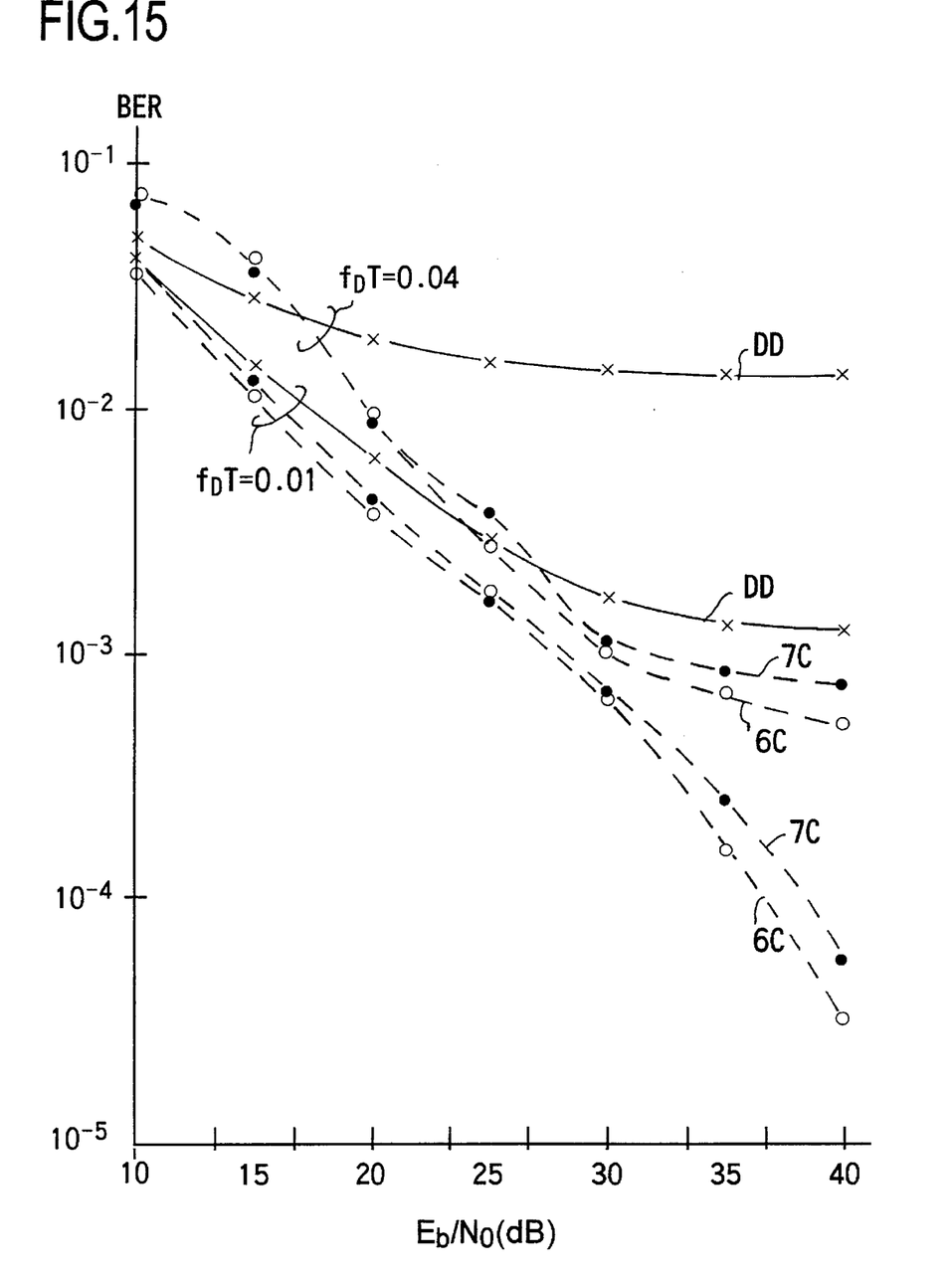
FIG. 15 is a graph showing error rate performance of the sixth and seventh embodiments under the fading environment obtained by computer simulations.

In FIG. 15 there are indicated by the curves 6C and 7C the performance of the sixth and seventh embodiments under the Rayleigh fading environment. $f_D T$ represents the speed of fading variation, $f_D$ the maximum Doppler frequency (i.e. moving speed of mobile terminal/wavelength of radio carrier) and T one symbol length. Accordingly, 1/T represents the transmission rate. In the differential detection, even if the mean $E_b/N_o$ is set large, the error rate approaches a fixed value and would not go down below it. In the sixth and seventh embodiments, however, the error rate can be reduced by setting the mean $E_b/N_o$ large.

As described above, in the sixth and seventh embodiments the prediction coefficient a can be changed in accordance with the fading environment of the received signal, so that the error rate performance is improved as compared with that in the differential detection, regardless of the presence or absence of the fading phenomenon; hence, the performance can be brought close to the ideal coherent detection performance.

I claim:

1. A maximum likelihood decoding coherent detection method for M-phase modulated signals with known signals inserted therein periodically, the method comprising the steps of:

(a) sampling a received signal at a time n with a transmitted symbol period T to obtain a received signal sample $z_n$;

(b) storing, in a metric memory at each point in time, $M^Q$ states each represented by a combination of Q successive modulated phases $\{\phi_{n-q}; q=1, 2, \ldots, Q-1, Q\}$ and paths each indicating the state at the immediately previous time from which a path most likely to reach one of said $M^Q$ states originates, and storing a path metric indicating the likelihood of each sequence that reaches one of said states in a metric memory;

(c) inversely modulating a received signal sample $z_{n-q}$ by $\phi_{n-q}$ and calculating the real value of the inner product of a value $z_n \exp(-j\phi_n)$ at q=0 and a summation $\Sigma z_{n-q} \exp(-j\phi_{n-q})$ from q=1 to Q, the real value being defined as a branch metric $\lambda(S_{n-1} \rightarrow S_n)$ indicating the likelihood of the transition from a state $S_{n-1}=\{\phi_{n-}; q=1, 2, \ldots, Q-1, Q\}$ at time n-1 to a state $S_n=\{\phi_{n-q}; q=0, 1, 2, \ldots, Q-1\}$;

(d) adding said branch metric to a path metric $\Lambda(S_{n-1})$ in said state $S_{n-1}$ at time n-1 to calculate a path metric $\Lambda(S_n|S_{n-1})$ of a candidate sequence which passes through said state $S_{n-1}$;

(e) repeating the calculation of said steps (c) and (d) for all states $S_{n-1}$ of paths at time n-1 which enter said state $S_n$, comparing the thus obtained path metrics in terms of magnitude, and selecting the state $S_{n-1}'$ of the maximum path metric;

(f) storing said state $S_{n-1}'$ in said path memory as the state of the path at time n-1 which is most likely to reach said state $S_n$ at time n, and storing its path metric $\Lambda(S_n|S_{n-1}')$ in said metric memory as the path metric $\Lambda(S_n)$ in said state $S_n$ at time n;

(g) repeating the above calculation for all of said $M^Q$ states at time n;

(h) comparing the path metrics in said $M^Q$ states in terms of magnitude to obtain a state $S_n'$ of the maximum path metric at the time of outputting a decoded symbol; and (i) tracing said path memory back for a fixed number D of points in time from said state $S_n'$, and outputting, as the phase of decoded symbol, the phase $\bar{\phi}_{n-D}$ which constitutes the state $S_{n-D}$ reached.

2. A maximum likelihood decoding coherent detection method which performs maximum likelihood decoding through the use of a path memory for storing the phase state at the immediately previous point in time from which each path originates which is most likely to reach one of M states indicating the modulated phase at each point in time, and a metric memory for storing, for each state, a path metric indicating the likelihood of a sequence that reaches the state, the method comprising the steps of:

(a) sampling a received signal with a transmitted symbol period to obtain a received signal sample $z_n$ at time n;

(b) at the time of selecting a path most likely to reach a state $S_n$ at time n from M phase states $S_{n-1}$ at time (n-1), tracing said path memory back from one of said M states at time n-1 to obtain a most likely sequence $\{\bar{\phi}_{n-1}, \bar{\phi}_{n-q|n-1}; q=2, 3, \ldots, Q-1, Q\}$ which ends with said state $S_{n-1}$, and calculating a reference signal $\eta_n$ using said sequence by $$\eta_n = z_{n-1}\exp(-j\bar{\phi}_{n-1}) + \sum_{q=2}^{Q} z_{n-q}\exp(-j\bar{\phi}_{n-q|n-1});$$

(c) calculating the inner product of a signal phase rotated $\phi_n$ from said reference signal $\eta_n$ and said received signal sample $z_n$ as a branch metric $\lambda(S_{n-1} \rightarrow S_n)$ indicating the likelihood of transition from said state $S_{n-1}$ at time n-1 to said state $S_n$ at time n;

(d) adding said branch metric $\lambda(S_{n-1}, S_n)$ to a path metric $\Lambda(S_{n-1})$ in said state $S_{n-1}$ at time n-1 to obtain a path metric $\Lambda(S_n|S_{n-1})$ of a candidate sequence which passes through said state $S_{n-1}$;

(e) repeating the calculations of said steps (b), (c) and (d) for all of said M states $S_{n-1}$ to obtain path metrics for M candidate sequences and comparing them in terms of magnitude to obtain a state $S_{n-1}'$ of the maximum path metric;

(f) storing said state $S_{n-1}'$ of the maximum path metric in said path memory as the state at time n-1 which is most likely to reach said state $S_n$ at time n, and storing its path metric $\Lambda(S_n|S_{n-1}')$ in said metric memory as the path metric $\Lambda(S_n)$ in said state $S_n$ at time n;

(g) repeating the above calculation for all of said M states to obtain M path metrics, and comparing them in terms of magnitude to obtain a state $S_n'$ of the maximum path metric; and tracing said path memory back for a fixed number D of points in time from said state $S_n'$, and outputting, as a decoded symbol phase $\bar{\phi}_{n-D}$, the phase $\phi_{n-D}$ which constitutes the state $S_{n-D}$ reached.

3. The maximum likelihood decoding coherent detection method of claim 2, wherein said step (b) of calculating said reference signal $\eta_n$ is a step wherein said reference signal $\eta_n$ on a path that passes through said state $S_{n-1}$ is calculated by the following equation using a forgetting factor $\eta$ equal to or smaller than 1 and a reference signal $\eta_{n-1}$ obtained at the immediately preceding time:

$$\eta_n = z_{n-1}exp(-j\bar{\phi}_{n-1}) + \mu\eta_{n-1}.$$

4. A maximum likelihood decoding coherent detection method for an M-phase modulated signal, comprising the steps of:

(a) sampling a received signal with a transmitted symbol period to obtain a received signal sample $z_n$ at time n;

(b) calculating a reference signal $\eta_n$ at time n−1 by the following equation using a decoded sequence $\{\bar{\phi}_{n-q}; q=1, 2, \ldots, Q-1, Q\}$ $$\eta_n = \sum_{q=1}^{Q} z_{n-1} \exp(-j\bar{\phi}_{n-q});$$

(c) calculating a branch metric $\lambda(S_{n-1} \to S_n)$ that represents the likelihood of transition from a state $S_{n-1}$ at time n−1 to a state $S_n$ at time n, using the inner product of said reference signal $\eta_n$ phase-rotated by $\phi_n$ and said received signal sample $z_n$; and (d) repeating said step (c) for all of M states $S_n$ to obtain branch metrics, then comparing them in terms of magnitude to obtain the state $S_n$ of the maximum branch metric, and outputting it as a decoded phase $\bar{\phi}_n$ corresponding to a decoded symbol.

5. The maximum likelihood decoding coherent detection method of claim 4, wherein said step (b) of calculating said reference signal $\eta_n$ is a step wherein a reference signal $\eta_n$ in said state $S_{n-1}$, which represents a decoded symbol at time n−1, is calculated by the following equation using a reference signal $\eta_{n-1}$ obtained at the immediately preceding time:

$$\eta_n = z_{n-1} \exp(-j\bar{\phi}_{n-1}) + \mu \eta_{n-1}.$$

6. A maximum likelihood decoding coherent detection method which performs maximum likelihood decoding through the use of a path memory for storing the phase state at the immediately previous point in time from which each path originates which is most likely to reach one of M states indicating the modulated phase at each point in time, and a metric memory for storing, for each state, a path metric indicating the likelihood of a sequence that reaches said each state, the method comprising the steps of:

(a) sampling a received signal with a transmitted symbol period to obtain a received signal sample $z_n$ at time n;

(b) calculating a reference signal $\eta_n$ by the following equation using a prediction coefficient $\alpha$ as a real number, $$\eta_n = (1+\alpha) z_{n-1} \exp(-j\phi_{n-1}) - \alpha z_{n-2} \exp(-j\phi_{n-2})$$

so as to calculate $M^2$ states $S_n$ at time n each represented by a combination of two successive phases $(\phi_n, \phi_{n-1})$ and branch metrics each indicating the state $S_{n-1}$ at the immediately previous time n from which a path most likely to reach one of said $M^2$ states originates;

(c) calculating a square error between said reference signal $\eta_n$ and said received signal sample $z_n$ phase-rotated by $-\phi_n$ as a branch metric $\lambda(S_{n-1} \to S_n)$ indicating the likelihood of transition from said state $S_{n-1}$ to $S_n$;

(d) adding said branch metric $\lambda(S_{n-1} \to S_n)$ to the path metric $H(S_{n-1})$ in said state $S_{n-1}$ at time n−1 to obtain the metric $H(S_n | S_{n-1})$ of a candidate sequence which passes through said state $S_{n-1}$;

(e) repeating the above calculations of said steps (b), (c) and (d) for all of said $M^2$ states $S_{n-1}$, comparing the resulting path metrics in terms of magnitude to obtain a state $S_{n-1}'$ of the minimum value, storing it in said path memory as the state through which a survival path reaches said state $S_n$ at time n, and storing its path metric $H(S_n | S_{n-1}')$ in said path metric memory as the path metric $H(S_n)$ in the state $S_n$; and (f) repeating the above operation of said step (e) for all of said $M^2$ states to obtain path metrics, comparing them in terms of magnitude to obtain a state $S_n'$ of the minimum value, tracing said path memory back for a fixed number D of points in time from said state $S_n'$, and outputting, as a decoded symbol phase $\bar{\phi}_{n-D}$, the phase $\phi_{n-D}$ which constitutes said state $S_{n-D}$ reached.

7. The maximum likelihood decoding coherent detection method of claim 6, wherein said state $S_n$ at time n is represented by only one phase $\phi_n$, and said step of calculating said reference signal is a step of calculating the reference signal $72_n$ by the following equation using said prediction coefficient and the phase $\phi_{n-2|n-1}$ at time n−2 on a survival path which ends with one of said states $S_{n-1}$:

$$\eta_n = (1+\alpha) z_{n-1} \exp(-j\bar{\phi}_{n-1}) - \alpha z_{n-2} \exp(-j\bar{\phi}_{n-2|n-1}).$$

8. The maximum likelihood decoding coherent detection method of claim 7, wherein said step of calculating said reference signal $\eta_n$ is a step of calculating it by the following equation using two previous decoded symbol phases $\bar{\phi}_{n-1}$ and $\bar{\phi}_{n-2}$:

$$\eta_n = (1+\alpha) z_{n-1} \exp(-j\bar{\phi}_{n-1}) - \alpha z_{n-2} \exp(-j\bar{\phi}_{n-2})$$

and said branch metric 1 is calculated from the inner product of said reference signal $\eta_n$ and said received signal sample $z_n$ phase-rotated by $-\phi_n$, said calculation is repeated for all of said M states $\phi_n$, the thus obtained branch metrics are compared in terms of magnitude to obtain a state $\phi_n$ of the maximum value and said state is outputted as said decoded symbol phase $\phi_n$.

9. The maximum likelihood decoding coherent detection method of claim 6 or 7, which further comprises the step wherein when a reference signal for obtaining a survival sequence to each state at time n is assumed, said prediction coefficient $\alpha$, which minimizes an error between said received signal sample and its linearly predicted value, is calculated by tracing back a survival path by a sequential error minimizing algorithm.

10. The maximum likelihood decoding coherent detection method of claim 8, which further comprises a step wherein when a reference signal for obtaining said decoded symbol phase $\phi_n$ is assumed, said prediction coefficient $\alpha$, which minimizes an error between said received signal sample and its linearly predicted value, is calculated by tracing back a decoded sequence by a sequential error minimizing algorithm.

11. The maximum likelihood decoding coherent detection method of claim 6, 7, or 8, wherein said reference signal calculating step is performed by replacing said received signal sample $z_{n-2}$ with said reference signal $\eta_{n-1}$.

* * * * *